United States Patent
Fukano et al.

(10) Patent No.: US 6,948,517 B2
(45) Date of Patent: Sep. 27, 2005

(54) TWO-WAY VALVE

(75) Inventors: Yoshihiro Fukano, Moriya (JP); Tadashi Uchino, Moriya (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/717,660

(22) Filed: Nov. 21, 2003

(65) Prior Publication Data

US 2004/0099311 A1 May 27, 2004

(30) Foreign Application Priority Data

Nov. 27, 2002 (JP) .................................... 2002-344616

(51) Int. Cl.[7] .................... G01M 3/04; F16K 31/122
(52) U.S. Cl. .................... 137/312; 251/63.5; 251/331
(58) Field of Search .................... 137/312; 73/40.5 R, 73/46; 239/106, 119, 586; 222/571; 251/61.2, 61.3, 61.4, 61.5, 63.5, 63.6, 331, 335.2

(56) References Cited

U.S. PATENT DOCUMENTS

| | | | |
|---|---|---|---|
| 1,855,991 A | | 4/1932 | Keith |
| 3,307,574 A | * | 3/1967 | Anderson .................... 137/312 |
| 3,982,558 A | * | 9/1976 | Ochs .................... 251/61.2 |
| 4,208,031 A | * | 6/1980 | Jonak .................... 251/61.2 |
| 4,901,751 A | * | 2/1990 | Story et al. .................... 137/312 |
| 5,002,086 A | | 3/1991 | Linder et al. |
| 5,779,224 A | * | 7/1998 | Fukano et al. .................... 251/331 |
| 5,971,296 A | * | 10/1999 | Fukano et al. .................... 239/119 |
| 6,000,416 A | * | 12/1999 | Kingsford et al. .................... 137/312 |
| 6,000,629 A | * | 12/1999 | Tamura et al. .................... 239/119 |
| 6,029,903 A | * | 2/2000 | Fukano et al. .................... 239/119 |
| 6,189,861 B1 | | 2/2001 | Gotch et al. |
| 6,321,776 B1 | * | 11/2001 | Pratt et al. .................... 137/312 |

FOREIGN PATENT DOCUMENTS

| | | |
|---|---|---|
| DE | 4244020 A1 | 7/1994 |
| DE | 29507638 U1 | 8/1995 |
| DE | 196 11 664 A1 | 11/1996 |
| DE | 198 11 191 A1 | 10/1998 |
| DE | 198 11 254 A1 | 10/1998 |
| EP | 1138989 A2 | 10/2001 |

* cited by examiner

*Primary Examiner*—Kevin Lee
(74) *Attorney, Agent, or Firm*—Paul A. Guss

(57) ABSTRACT

A piston is arranged in a connecting body. A first diaphragm is provided at a lower portion of a shaft which is displaceable in the axial direction together with the piston. A second diaphragm is provided at an upper position spaced by a predetermined distance from the first diaphragm so that the second diaphragm is substantially in parallel to the first diaphragm. When the fluid permeates through the first diaphragm, the fluid is blocked by the second diaphragm. A buffering spring member is installed in a space which is defined between the second diaphragm and a first skirt section formed to extend radially outwardly from a main body section of the first diaphragm, and the pressing force exerted on the first diaphragm and the second diaphragm is reduced thereby.

28 Claims, 7 Drawing Sheets

TWO-WAY VALVE

BACKGROUND OF THE INVENTION

1. Field of the Invention

The present invention relates to a two-way valve for switching a valve-open state and a valve-closed state of a valve plug which is displaceable, for example, by a pilot pressure to switch the flowing of a fluid.

2. Description of the Related Art

A two-way valve device is used to switch a communication state and a non-communication state of a fluid flowing through a fluid passage. In the device, a valve is displaceable by the pilot pressure to switch the flowing state of the fluid.

As shown in FIG. 7, for example, such a two-way valve 1 comprises a housing 3 formed with a fluid passage 2c which communicates with an inlet port 2a and an outlet port 2b for supplying/discharging the fluid. A bonnet 5, which includes an upper piston 4a and a lower piston 4b provided displaceably therein, is connected to an upper portion of the housing 3. A spring 7 is interposed between the upper piston 4a and a cap member 6 which is installed in the bonnet 5. A diaphragm 9 is connected to a lower portion of a shaft 8 which is connected to the upper piston 4a and the lower piston 4b.

The diaphragm 9 is formed of a resin material. A circumferential edge section 11 of a thin-walled film section 10, which extends radially outwardly from a substantially central portion, is interposed between the housing 3 and a guide member 12 which is provided in the housing 3.

The upper piston 4a and the lower piston 4b are displaced upwardly in the axial direction integrally by the pilot pressure introduced into the space disposed under the lower piston 4b. Accordingly, the shaft 8 integrally connected to the upper piston 4a and the lower piston 4b is displaced upwardly. Thus, the diaphragm 9 is separated from a valve seat 13 provided on the housing 3, which is a valve-open state.

When the supply of the pilot pressure is stopped to be a state open to the atmospheric air, the upper piston 4a is pressed downwardly by the spring force of the spring 7. The diaphragm 9 is seated on the valve seat 13 by the shaft 8 when the upper piston 4a is displaced. Accordingly, the flow of the fluid flowing through the fluid passage 2c is blocked (see, for example, columns 2 and 3 of U.S. Pat. No. 5,002,086).

In the two-way valve 1 described in U.S. Pat. No. 5,002,086, when some gas or liquid flows through the fluid passage 2c of the housing 3, the gas itself or the gas generated by the vaporization of the liquid may enter the interior of the two-way valve 1 as a result of the permeation through the thin-walled film section 10 of the diaphragm 9 of the resin material, depending on the type of the gas or the liquid (for example, hydrochloric acid).

In such a situation, the gas may enter the interior of the bonnet 5, and the durability of the spring 7 provided in the bonnet 5 may be deteriorated by the influence of the gas.

SUMMARY OF THE INVENTION

A general object of the present invention is to provide a two-way valve which makes it possible to improve the durability by preventing a fluid from flowing into the interior of the body.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
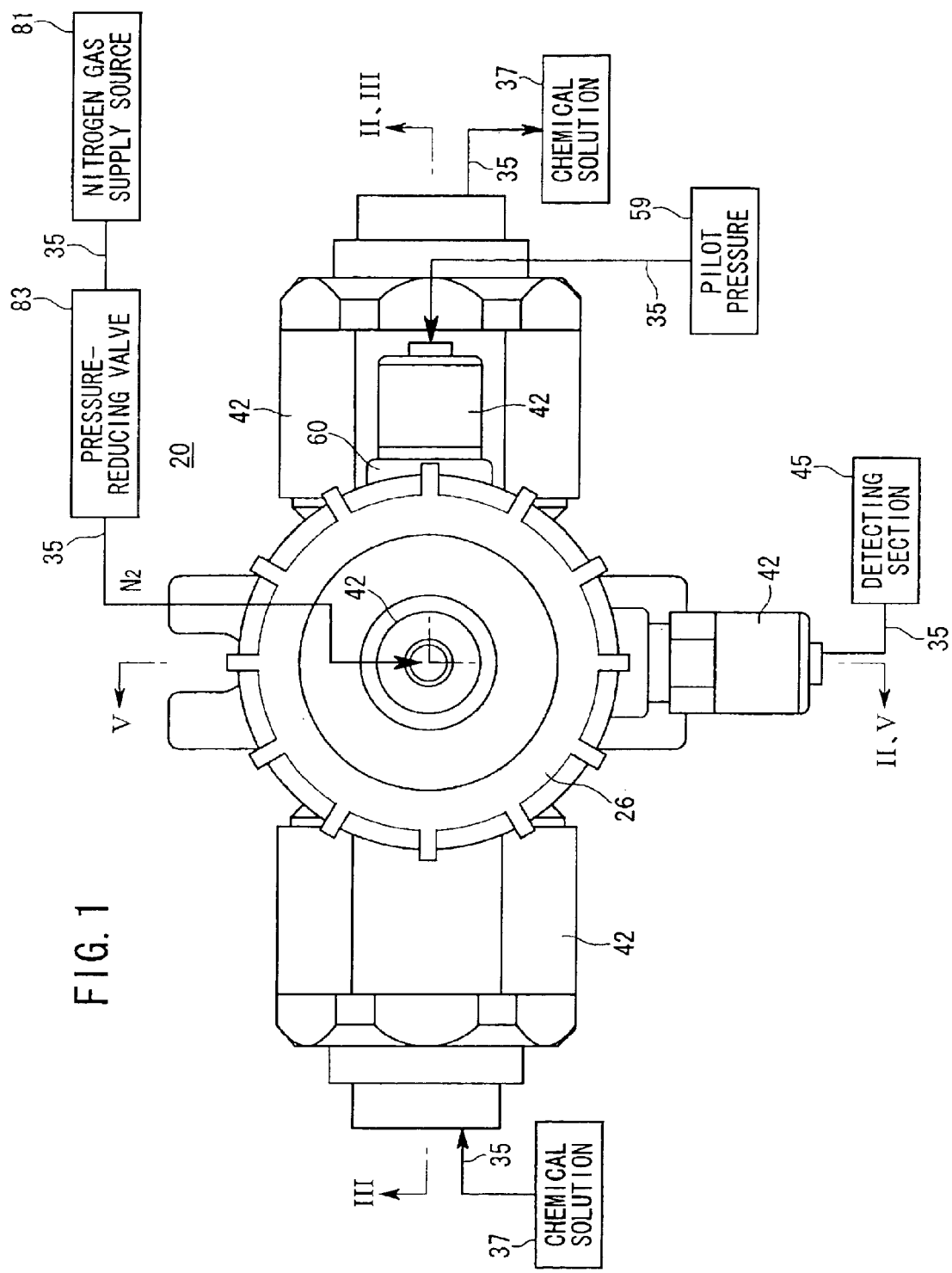
FIG. 1 is a plan view illustrating a two-way valve according to an embodiment of the present invention.

With reference to FIGS. 1 to 5, reference numeral 20 indicates a two-way valve according to an embodiment of the present invention.

Figure 2:
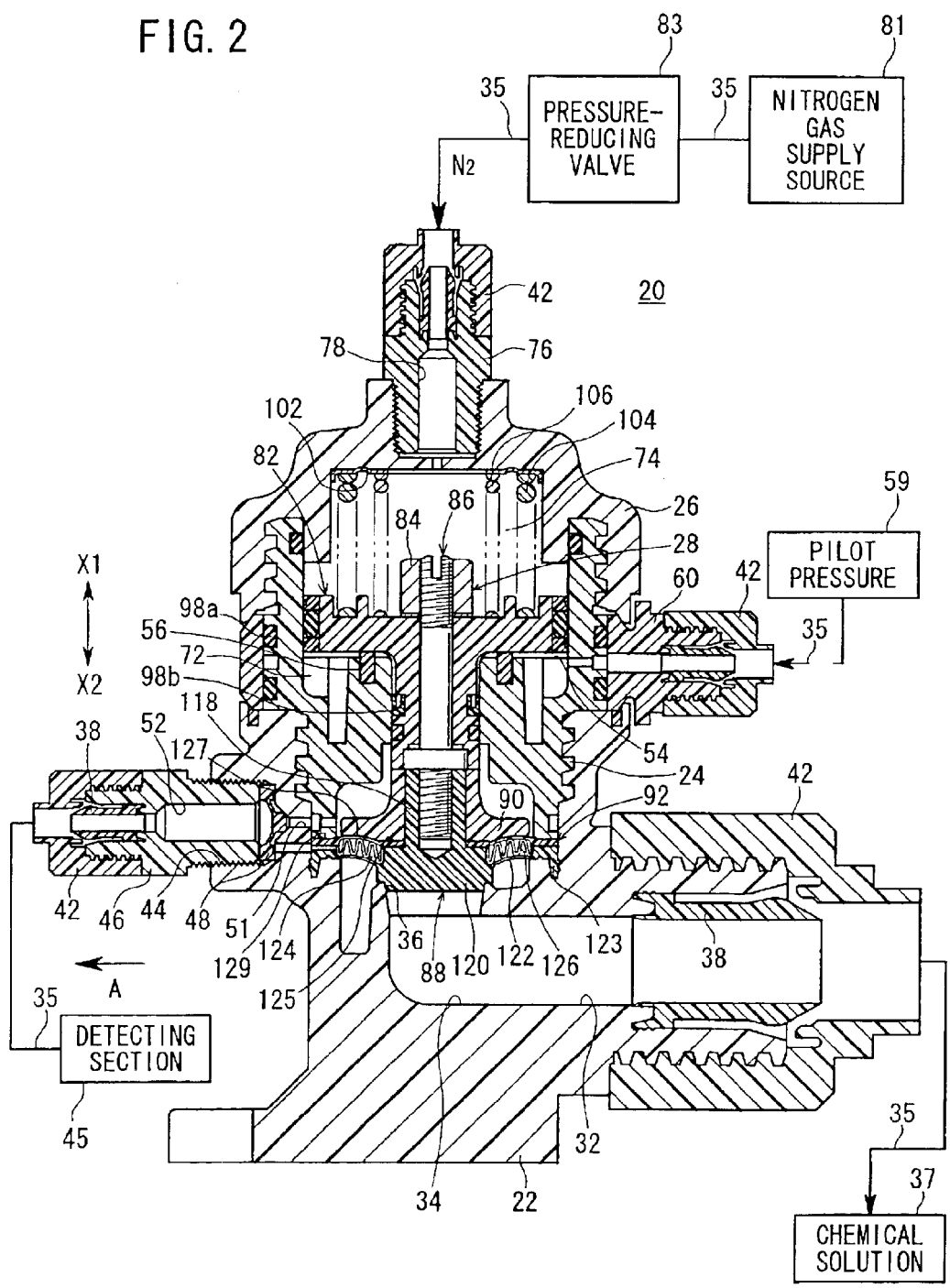
FIG. 2 is a vertical sectional view taken along a line II—II shown in FIG. 1.
Figure 3:
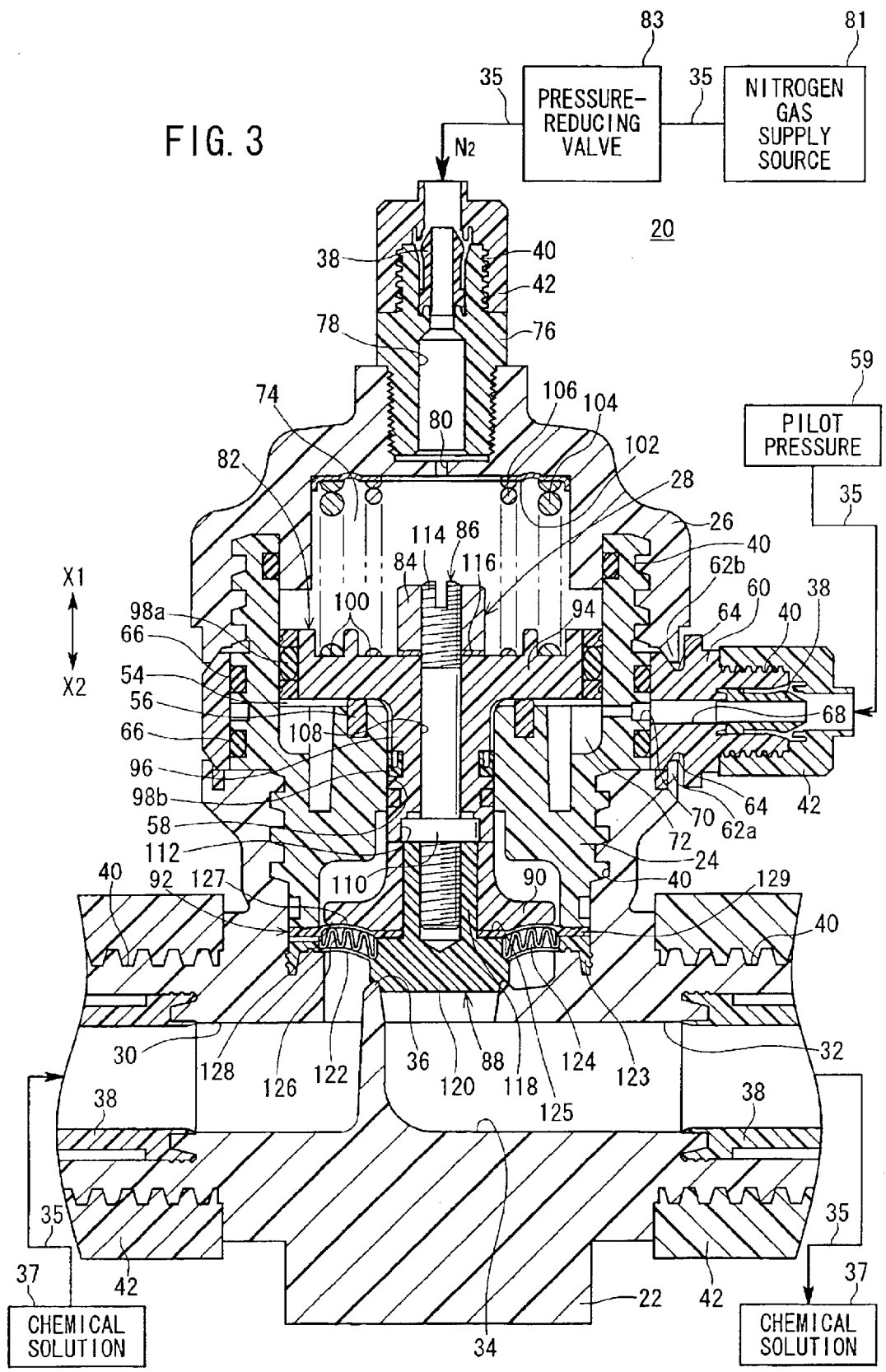
FIG. 3 is, with partial omission, a vertical sectional view taken along a line III—III shown in FIG. 1.
Figure 4:
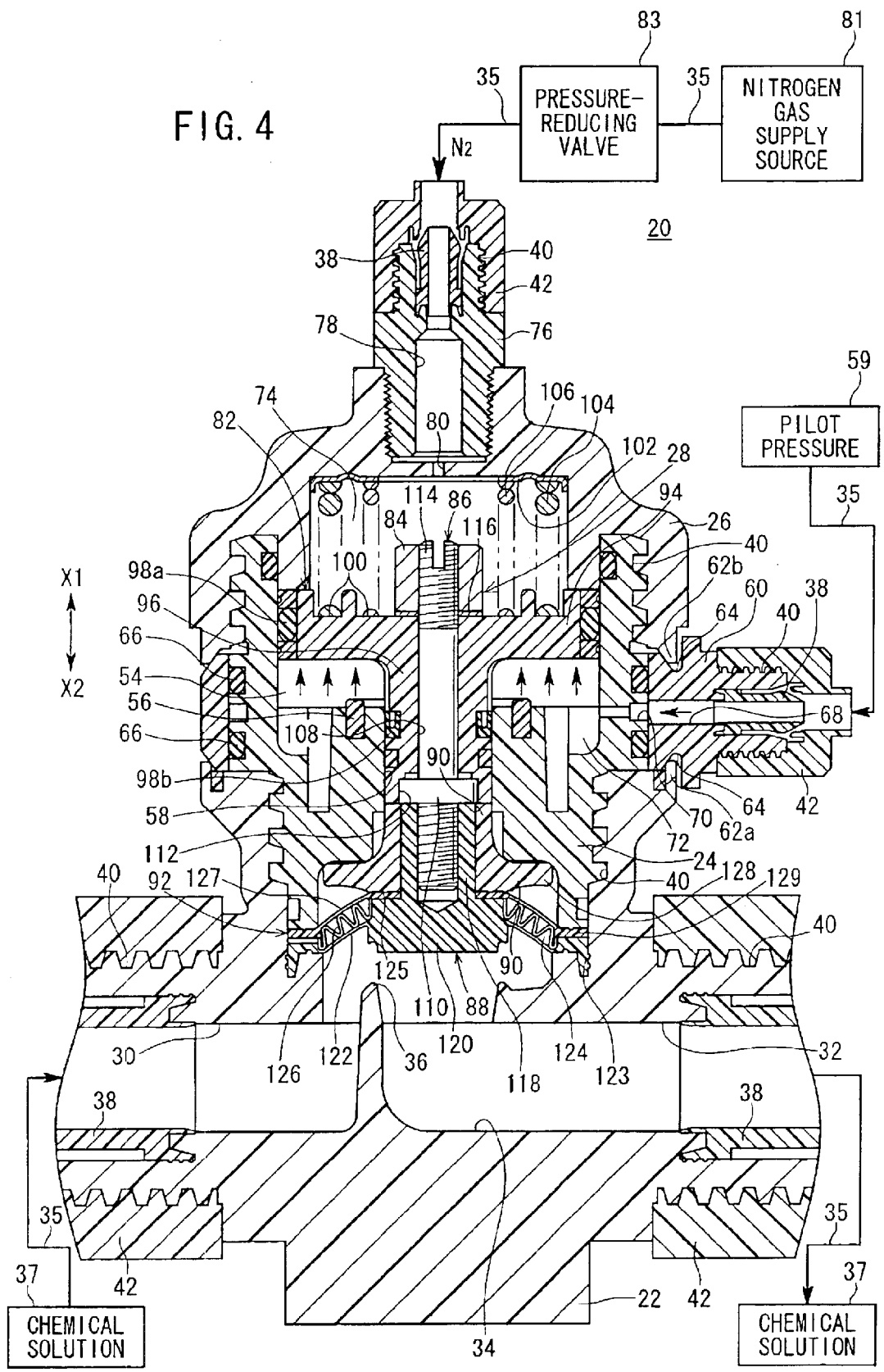
FIG. 4 is, with partial omission, a vertical sectional view illustrating the valve-open state of the two-way valve shown in FIG. 3.

As shown in FIGS. 2 to 4, the two-way valve 20 comprises a valve body 22 through which a fluid flows, a connecting body 24 which is connected to an upper portion of the valve body 22, a housing 26 which is connected to an upper portion of the connecting body 24, and a valve mechanism section 28 which is arranged in the connecting body 24 and the housing 26.

As shown in FIGS. 3 and 4, the valve body 22 has a first port 30 which is formed on one end and a second port 32 which is formed on the other end. A communication passage (fluid passage) 34, which communicates with the first port 30 and the second port 32, is formed in the valve body 22.

A valve seat 36, on which a first diaphragm 88 is seated as described later on, is formed in the communication passage 34. Inner members 38 are arranged in the first port 30 and the second port 32, which are inserted into openings of tubes 35 for flowing a chemical solution 37. For example, the chemical solution 37 is used to wash semiconductor chips. Lock nuts 42 are screwed with screw grooves 40 which are engraved on outer circumferential portions of the first port 30 and the second port 32. That is, the inner members 38, into which the tubes 35 are inserted, are connected by the lock nuts 42 to the first and second ports 30, 32. Therefore, liquid tightness is retained at the connecting portions of the tubes 35 connected to the first port 30 and the second port 32.

On the other hand, as shown in FIG. 2, a sensor plug 46 is screwed with an installation hole 44 which is formed on the side surface of the valve body 22. A detecting section 45 (for example, a pressure sensor) is connected with the installation hole 44. A check valve 48 of a resin material is interposed between the end surface of the sensor plug 46 in the installation hole 44 and the end surface of the installation hole 44. The check valve 48 has a substantially central portion which is displaceable in the axial direction of the sensor plug 46 by the pressure of the fluid discharged to a communication passage 51 from a third port (connecting port) 50 (see FIG. 5) as described later on.

An inner member 38 is arranged in the sensor plug 46, and is inserted into the opening of the tube 35. A lock nut 42 is screwed with a screw groove 40 formed on the outer circumference of the sensor plug 46.

Figure 5:
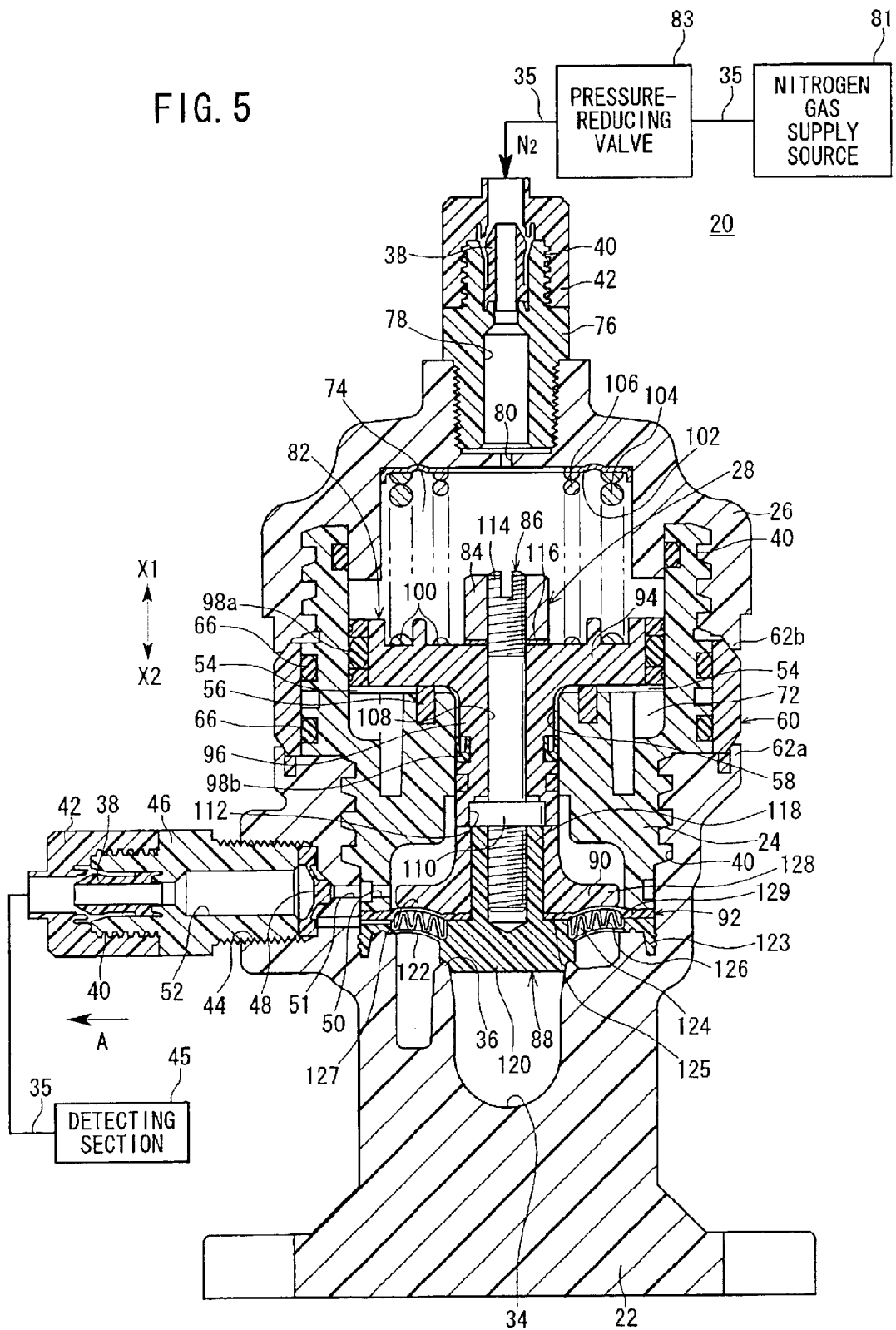
FIG. 5 is a vertical sectional view taken along a line V—V shown in FIG. 1.
Figure 6:
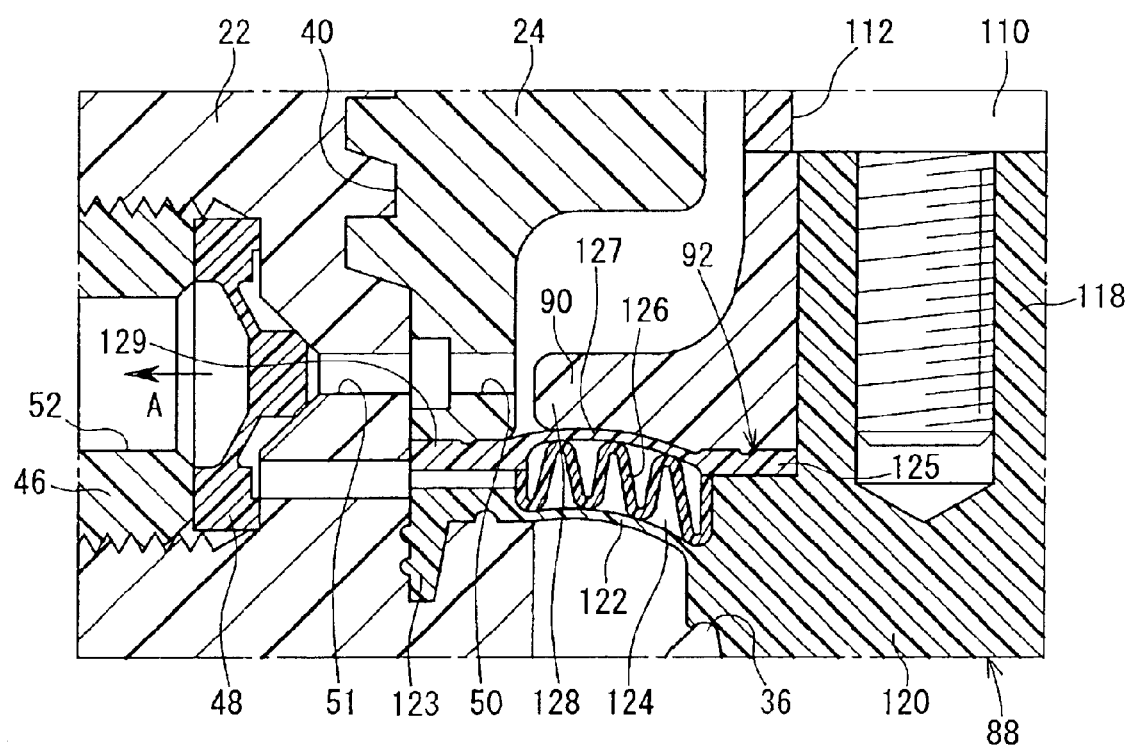
FIG. 6 is a magnified vertical sectional view illustrating elements in the vicinity of first and second diaphragms of the two-way valve shown in FIG. 2.
Figure 7:
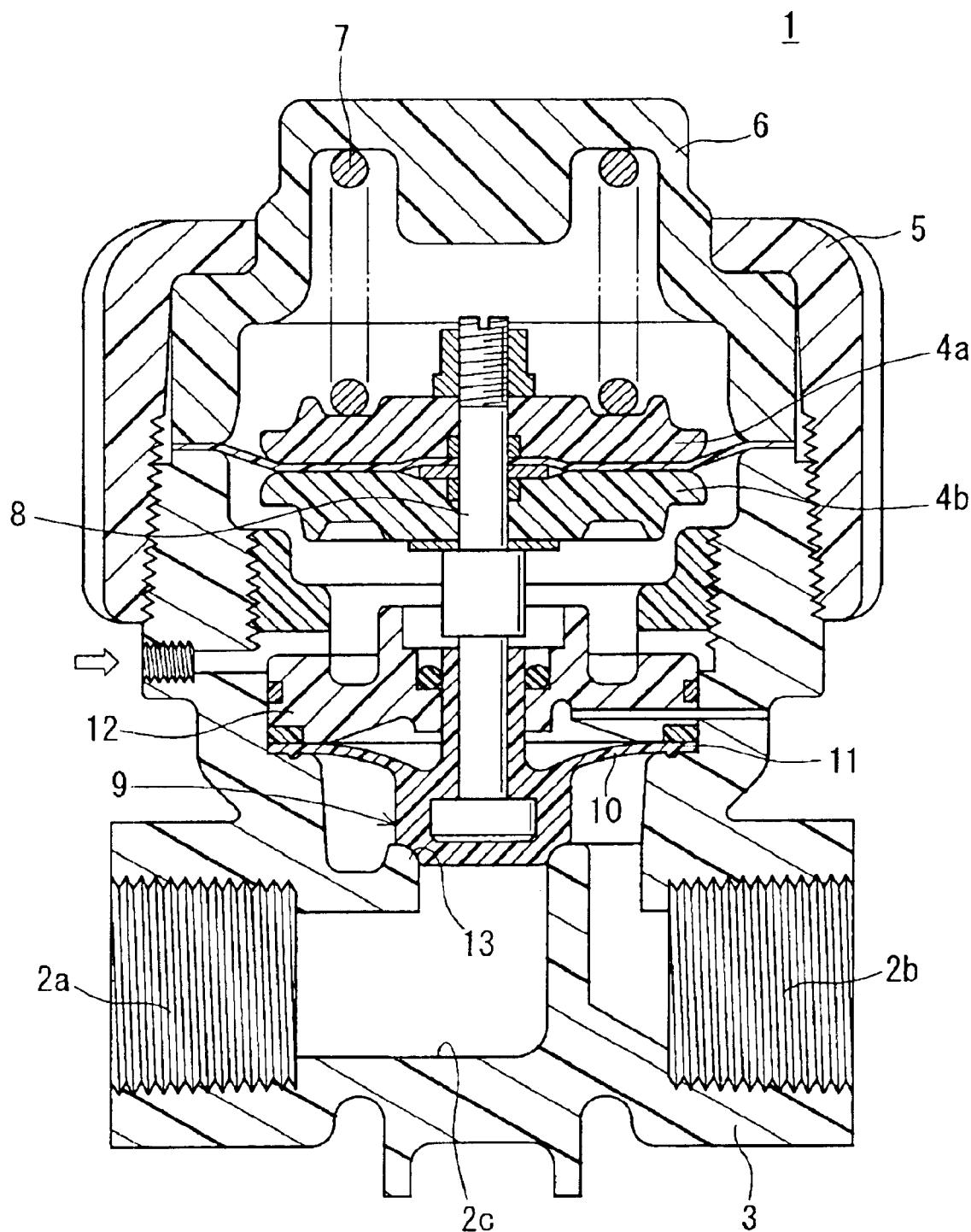
FIG. 7 is a vertical sectional view illustrating a conventional two-way valve.

As shown in FIG. 5, a passage 52 is formed in the sensor plug 46, and penetrates in the axial direction. The passage 52 is formed substantially in a straight form so that the passage 52 faces a communication passage 51 formed through the side surface of the connecting body 24 and the third port 50 formed in the connecting body 24.

That is, when the fluid is introduced through the third port 50 to the communication passage 51, the check valve 48 is displaced toward the sensor plug 46 (in the direction of the arrow A). Accordingly, the fluid in the passage 52 is pressed by the displacement of the check valve 48 toward the lock nut 42 (in the direction of the arrow A). The change of the pressure generated by the fluid is detected by the detecting section 45. The detecting section 45 may be provided outside the two-way valve 20 via the tube 35 as shown in FIGS. 2 and 5. Alternatively, the detecting section 45 may be provided inside the sensor plug 46.

As shown in FIGS. 2 to 4, the outer circumferential portion of the connecting body 24 is screwed on the valve body 22 with a screw groove 40 which is engraved on the inner circumferential portion. The valve body 22 and the connecting body 24 are connected integrally.

A cylinder chamber 54, in which a piston 82 is arranged displaceably in the axial direction as described later on, is formed in the connecting body 24.

A buffer member 56 is installed to an annular groove formed on the lower surface of the cylinder chamber 54. When the piston 82 is displaced downwardly (in the direction of the arrow X2) by the repulsive forces of a first spring member (spring) 104 and a second spring member (spring) 106 as described later on, the shock generated on the piston 82 can be reduced by the buffer member 56. An insertion hole 58 has a diameter smaller than that of the cylinder chamber 54. The insertion hole 58 is formed under the cylinder chamber 54, and the cylinder chamber 54 communicates with the communication passage 34 of the valve body 22.

A first connecting plug 60 is installed to the side surface of the connecting body 24. The pilot pressure 59 is supplied via a tube 35 to the first connecting plug 60. An inner member 38, which is inserted into the opening of the tube 35, is arranged in the first connecting plug 60. A lock nut 42 is screwed with a screw groove 40 formed on the outer circumference of the first connecting plug 60.

Projections 62a, 62b, which protrude so that they are opposed to one another in the directions toward the first connecting plug 60, are formed in the circumferential direction on the side surfaces of the valve body 22 and the housing 26, respectively. The projections 62a, 62b are engaged with recesses 64 of the first connecting plug 60. Therefore, the first connecting plug 60 is installed displaceably in the circumferential direction to the side surface of the connecting body 24.

Seal members 66 are installed to annular grooves formed on the side surface of the connecting body 24 to which the first connecting plug 60 is installed. Therefore, the pilot pressure 59, which is supplied via a passage 68 of the first connecting plug 60, does not leak outside.

The passage 68 of the first connecting plug 60 communicates with the cylinder chamber 54 via a fourth port 70 which is formed through the side surface of the connecting body 24 and a communication chamber 72 which is formed in the connecting body 24.

A screw groove 40 is engraved on an upper outer circumferential portion of the connecting body 24, with which an inner circumferential portion of the housing 26 is screwed. Accordingly, the connecting body 24 and the housing 26 are connected to one another integrally. A chamber 74 is formed in the housing 26.

A second connecting plug (connecting member) 76, to which a pressure fluid (for example, nitrogen gas) is always supplied via a tube 35, is installed to an upper portion of the housing 26 in order to avoid any deterioration of the first spring member 104 and the second spring member 106.

An inner member 38, which is inserted into the opening of the tube 35, is arranged in the second connecting plug 76. A lock nut 42 is screwed with a screw groove 40 formed on the outer circumference of the second connecting plug 76.

The second connecting plug 76 is integrally screwed with an upper portion of the housing 26. A passage 78, which is formed in the axial direction in the second connecting plug 76, communicates with the chamber 74 via a communication passage 80 of the housing 26. That is, for example, the nitrogen gas supplied from a nitrogen gas supply source 81 is subjected to pressure reduction to have a predetermined pressure by means of a pressure-reducing valve 83, and then the nitrogen gas is supplied into the chamber 74 from the second connecting plug 76 via the tube 35 connected to the pressure-reducing valve 83. The interior of the chamber 74 is always filled with the nitrogen gas, since the nitrogen gas is continuously supplied into the chamber 74. Therefore, the first spring member 104 and the second spring member 106 can be prevented from any deterioration (for example, any corrosion).

The pressure fluid supplied to the second connecting plug 76 is not limited to the nitrogen gas. Any pressure fluid may be used as long as the fluid avoids the deterioration of the first spring member 104 and the second spring member 106 provided in the chamber 74.

The valve mechanism section 28 includes the piston 82 which is provided displaceably in the axial direction in the cylinder chamber 54, and a shaft 86 which is inserted into a substantially central portion of the piston 82 and which is connected to the piston 82 by a nut 84. The valve mechanism section 28 further includes the first diaphragm 88 which is integrally connected to a lower end portion of the shaft 86, a holding member 90 which is installed to a shaft section 118 of the first diaphragm 88 and which is displaceable together with the piston 82, and a thin plate-shaped second diaphragm 92 which is interposed between the first diaphragm 88 and the holding member 90.

The piston 82 is formed to have a substantially T-shaped cross section. As shown in FIGS. 2 to 4, a large diameter section 94 on the upper side is inserted into the cylinder chamber 54. A small diameter section 96 on the lower side having a diameter smaller than that of the large diameter section 94 is inserted into the insertion hole 58. A piston packing 98a is installed to an annular groove formed on the outer circumferential surface of the large diameter section 94, which retains air tightness in the cylinder chamber 54 when the piston 82 slides by contacting the inner circumferential surface of the cylinder chamber 54.

A piston packing 98b is also installed to an annular groove formed on the outer circumferential surface of the small diameter section 96 in the same manner as described above, which retains air tightness of the cylinder chamber 54 and the communication passage 34 of the valve body 22 by contacting the inner circumferential surface of the insertion hole 58 as shown in FIGS. 1 to 4.

Annular recesses 100 are formed on the upper surface of the piston 82. The first spring member 104 is interposed between the annular recess 100 and a spring-receiving member 102 which is installed to the upper surface of the chamber 74. One end of the first spring member 104 installed to the upper surface of the piston 82 is fastened by the annular recess 100 which is recessed by a predetermined depth. Therefore, no displacement is made in the radial direction.

The second spring member 106 is interposed between the spring-receiving member 102 and the annular recess 100 of the piston 82 on the inner circumferential side of the first spring member 104. The first spring member 104 and the second spring member 106 urge the piston 82 downwardly (in the direction of the arrow X2).

On the other hand, a through-hole 108 is formed penetratingly through a substantially central portion of the piston 82. The shaft 86 is inserted into the through-hole 108. A flange section 110 has an expanded diameter at a lower portion of the shaft 86, and is engaged with an engaging groove 112 which is formed on the lower surface of the piston 82. The nut 84 is screwed with a screw section 114 formed at an upper portion of the shaft 86 with a washer 116 interposed therebetween. Accordingly, the piston 82 and the shaft 86 are connected to one another integrally.

As shown in FIG. 5, the first diaphragm 88 is formed of a resin material (for example, PTFE (polytetrafluoroethylene)). The first diaphragm 88 comprises the shaft section 118 which is integrally screwed with the lower end of the shaft 86, a main body section 120 which protrudes from the lower end of the shaft section 118 and which is to be seated on the valve seat 36, and a thin-walled first skirt section 122 which extends radially outwardly from the side surface of the main body section 120. A circumferential edge 123 of the skirt section 122 is interposed between the valve body 22 and the connecting body 24.

The first diaphragm 88 freely opens/closes the communication passage 34 for communication between the first port 30 and the second port 32 such that the main body section 120 is seated on the valve seat 36 formed on the valve body 22 or the main body section 120 is separated from the valve seat 36.

The second diaphragm 92, which is composed of a resin material (for example, PTFE), is arranged over the first diaphragm 88. The second diaphragm 92 comprises an inner edge 125 which is interposed between the holding member 90 and the main body section 120 of the first diaphragm 88, a second skirt section 127 which extends radially outwardly from the inner edge 125, and an outer edge 129 which is provided at the outer circumference of the second skirt section 127 and which is interposed between the circumferential edge 123 of the first diaphragm 88 and the lower surface of the connecting body 24. The inner edge 125 of the second diaphragm 92 is axially attached to the upper surface of the main body section 120 of the first diaphragm 88.

A surrounded space 124 is formed between the first skirt section 122 of the first diaphragm 88 and the second skirt section 127 of the second diaphragm 92. A buffering spring member (elastic member) 126 is arranged in the space 124, and is bent in a wavy form at a plurality of positions (or corrugated) from the inner circumferential side toward the outer circumferential side of the first diaphragm 88 and the second diaphragm 92.

The buffering spring member 126 is formed of a resin material (for example, PTFE) in the same manner as the first and second diaphragms 88, 92. The buffering spring member 126 is interposed between the first diaphragm 88 and the second diaphragm 92 so that the buffering spring member 126 contacts the wall surface of the first diaphragm 88 and the wall surface of the second diaphragm 92.

That is, the buffering spring member 126 urges the first skirt section 122 and the second skirt section 127 to be separated from each other. Therefore, the first skirt section 122 and the second skirt section 127 are always spaced from each other by a predetermined distance. Even when the pressure is applied from the fluid to the first skirt section 122 in the thin-walled shape at the time of the fluid flowing from the first port 30 to the second port 32, it is possible to protect the first skirt section 122, because the pressure is buffered by the buffering spring member 126.

As shown in FIGS. 2 and 3, the holding member 90 is integrally installed to the outer circumferential surface of the shaft section 118 of the first diaphragm 88. The holding member 90 retains the upper surface of the second diaphragm 92 by a holding section 128 which is disposed at a lower portion thereof and which is expanded radially outwardly.

The two-way valve 20 according to the embodiment of the present invention is basically constructed as described above. Next, its operation, function, and effect will be explained.

FIG. 3 shows that the pilot pressure 59 is not supplied into the cylinder chamber 54 via the first connecting plug 60, and the first diaphragm 88 is seated on the valve seat 36 by the repulsive forces of the first spring member 104 and the second spring member 106 to block the communication between the first port 30 and the second port 32.

Starting from the state as described above, the pilot pressure 59 (for example, compressed air) is supplied into the cylinder chamber 54 via the tube 35 connected to the first connecting plug 60.

As shown in FIG. 4, the piston 82 is displaced upwardly (in the direction of the arrow X1) against the repulsive forces of the first spring member 104 and the second spring member 106 by the pilot pressure 59 supplied to the cylinder chamber 54. During this process, the shaft 86 connected to the substantially central portion of the piston 82 is displaced upwardly (in the direction of the arrow X1) integrally, and the main body section 120 of the first diaphragm 88 connected to the lower end of the shaft 86 is separated from the valve seat 36. Thus, the first port 30 communicates with the second port 32 via the communication passage 34. Accordingly, the fluid flows from the first port 30 to the second port 32.

The second diaphragm 92 is displaced upwardly (in the direction of the arrow X1) together with the buffering spring member 126 by the displacement of the first diaphragm 88 in the upward direction (direction of the arrow X1).

When the fluid (for example, the chemical solution 37 for washing semiconductor chips) from the first port 30 flows through the communication passage 34 to the second port 32, then the first skirt section 122 of the first diaphragm 88 is pressed by the fluid, and the buffering spring member 126 is pressed in the direction toward the second diaphragm 92 via the first skirt section 122. During this process, the pressing force exerted by the fluid is absorbed by the contraction of the buffering spring member 126. Therefore, the pressing force, which is exerted on the first skirt section 122 of the first diaphragm 88, is buffered, and it is possible to improve the durability of the first diaphragm 88.

On the other hand, when the fluid flows through the communication passage 34, the fluid permeates into the space 124 through the thin-walled first skirt section 122 of the first diaphragm 88 depending on the type of the fluid. Even in such a situation, the second diaphragm 92 makes it possible to prevent the interior of the chamber 74 of the housing 26 from being invaded by the fluid permeated through the first skirt section 122, because the second diaphragm 92 is arranged over the first skirt section 122 with the space 124.

Additionally, if the fluid entered the space 124 through the first skirt section 122 of the first diaphragm 88, the concentration of the fluid is lowered by the air contained in the space 124. Therefore, the first spring member 104 and the second spring member 106, which are interposed in the chamber 74, are not deteriorated by the permeated fluid.

Even if the permeated fluid should enter the interior of the connecting body 24 from the first skirt section 122 of the first diaphragm 88 via the space 124 and the second skirt section 127 of the second diaphragm 92 by chance, the fluid is discharged from the third port 50 to the communication passage 51. The check valve 48 is displaced by the fluid toward the sensor plug 46 (in the direction of the arrow A), and the fluid contained in the passage 52 is displaced outside. As a result, the detecting section 45 detects the change of the fluid. Thus, it is possible to confirm the entry of the permeated fluid into the connecting body 24.

Reversely to the above, it is explained that starting from the valve-open state (see FIG. 3) in which the first diaphragm 88 is separated from the valve seat 36, the first diaphragm 88 is seated on the valve seat 36 to block the communication between the first port 30 and the second port 32 (the valve-closed state (see FIG. 2)). The supply of the pilot pressure 59 from the tube 35 connected to the first connecting plug 60 is stopped to be open to the atmospheric air.

As a result of the interior of the cylinder chamber 54 being open to the atmospheric air, the piston 82 displaced upwardly by the action of the pilot pressure 59 is now displaced downwardly (in the direction of the arrow X2) by the resilient forces of the first spring member 104 and the second spring member 106. During this process, the shock generated when the piston 82 abuts against the lower surface of the cylinder chamber 54 is reduced by the buffer member 56 provided on the lower surface of the cylinder chamber 54.

When the piston 82 is displaced downwardly (in the direction of the arrow X2), the first diaphragm 88 integrally connected by the shaft 86 is seated on the valve seat 36 and the communication between the first port 30 and the second port 32 is blocked (the valve-closed state).

As described above, in the embodiment of the present invention, the second diaphragm 92 is provided over the first skirt section 122 of the first diaphragm 88 while being spaced by the predetermined distance, and the second diaphragm 92 is displaced integrally by the displacement of the piston 82 in the axial direction. Even when the fluid flowing through the communication passage 34 of the valve body 22 permeates through the first skirt section 122, it is possible to avoid the entry of the fluid into the connecting body 24 and the housing 26 by the second diaphragm 92 and the space 124. Therefore, the first spring member 104 and the second spring member 106, which are in the chamber 74 of the housing 26, are prevented from being deteriorated by the fluid.

The buffering spring member 126, which is corrugated, is arranged in the space 124 which is defined between the first skirt section 122 of the first diaphragm 88 and the second skirt section 127 of the second diaphragm 92. Therefore, when the fluid flows through the communication passage 34, the pressing force exerted on the first skirt section 122 can be absorbed and reduced by the contraction of the buffering spring member 126 in the direction toward the second diaphragm 92. Accordingly, the loads generated on the first skirt section 122 of the first diaphragm 88 and the second skirt section 127 of the second diaphragm 92 are reduced, making it possible to improve the durability.

If the first skirt section 122 of the first diaphragm 88 is broken by chance, the second diaphragm 92 can be substituted for the first diaphragm 88 to switch the communication of the fluid flowing from the first port 30 to the second port 32.

The second connecting plug 76 installed to the upper portion of the housing 26 is connected to the nitrogen gas supply source 81 via the tube 35. Thus, the nitrogen gas is always supplied to the chamber 74 which is communicated with the second connecting plug 76. Therefore, the deterioration (for example, corrosion) of the first spring member 104 and the second spring member 106 interposed in the chamber 74 can be appropriately avoided by the nitrogen gas.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A two-way valve comprising:
   a body in which a fluid passage for flowing a fluid is formed;
   a piston which is provided in said body displaceably in an axial direction by a pilot pressure;
   a shaft which is integrally connected to said piston;
   a first diaphragm which is connected to one end of said shaft and which closes said fluid passage when said first diaphragm is seated on a valve seat formed on said body; and
   a second diaphragm which is axially attached so that said second diaphragm is coaxially superimposed on said first diaphragm and which is provided displaceably together with said first diaphragm,
   wherein a space is formed between a first skirt section of said first diaphragm extending radially outwardly and a second skirt section of said second diaphragm extending radially outwardly, and an elastic member is arranged in said space, said elastic member comprising a buffering spring member which is corrugated with a plurality of corrugations extending in a direction from an inner circumferential side to an outer circumferential side of said first diaphragm and said second diaphragm, for urging said first skirt section and said second skirt section to separate from each other, and
   wherein said plurality of corrugations of said buffering spring member are interposed in said space between said first skirt section and said second skirt section, so that ridge portions of said plurality of corrugations contact a wall surface of said first skirt section and a wall surface of said second skirt section, and said space permeates through plural groove portions of said plurality of corrugations.

2. The two-way valve according to claim 1, wherein said buffering spring member is formed of the same resin material as a resin material of the first diaphragm and the second diaphragm.

3. The two-way valve according to claim 1, wherein said body is provided with a detecting section which detects a pressure value of said fluid when said fluid, which flows through said fluid passage, leaks out.

4. The two-way valve according to claim 3, wherein said body is formed with a connecting port which communicates with said detecting section, and a check valve is provided in said connecting port, said check valve being displaceable by pressure of said fluid discharged from said body.

5. The two-way valve according to claim 1, wherein said second diaphragm is retained by a holding section of a holding member which is axially attached to said shaft, said holding section being expanded radially outwardly.

6. The two-way valve according to claim 1, further comprising a housing which is connected to an upper portion of said body, and a spring made of metal disposed in a chamber which is formed between said housing and said piston provided diaplaceably in said housing, wherein said spring urges said first diaphragm in a direction to be seated on said valve seat.

7. The two-way valve according to claim 6, wherein a connecting member is installed to said chamber and is connected to a nitrogen gas supply source, and nitrogen gas is supplied into said chamber via said connecting member.

8. The two-way valve according to claim 1, wherein a chemical solution for washing semiconductor chips flows through said fluid passage.

9. A two-way valve comprising:
a body in which a fluid passage for flowing a fluid is formed;
a piston which is provided in said body displaceably in an axial direction by a pilot pressure;
a shaft which is integrally connected to said piston;
a first diaphragm which is connected to one end of said shaft and which closes said fluid passage when said first diaphragm is seated on a valve seat formed on said body; and
a second diaphragm which is axially attached so that said second diaphragm is coaxially superimposed on said first diaphragm and which is provided displaceably together with said first diaphragm,
wherein a space is formed between a first skirt section of said first diaphragm extending radially outwardly and a second skirt section of said second diaphragm extending radially outwardly, and
wherein said second diaphragm is retained by a holding section of a holding member which is axially attached to said shaft, said holding section being expanded radially outwardly.

10. The two-way valve according to claim 9, wherein an elastic member is arranged in said space, and said elastic member urges said first skirt section and said second skirt section to separate from each other.

11. The two-way valve according to claim 10, wherein said elastic member comprises a buffering spring member which is corrugated in a direction from an inner circumferential side to an outer circumferential side of said first diaphragm and said second diaphragm.

12. The two-way valve according to claim 11, wherein said buffering spring member is formed of the same resin material as a resin material of the first diaphragm and the second diaphragm.

13. The two-way valve according to claim 11, wherein a corrugated portion of said buffering spring member is interposed between said first diaphragm and said second diaphragm so that said portion contacts a wall surface of said first diaphragm and a wall surface of said second diaphragm.

14. The two-way valve according to claim 9, wherein said body is provided with a detecting section which detects a pressure value of said fluid when said fluid, which flows through said fluid passages leaks out.

15. The two-way valve according to claim 14, wherein said body is formed with a connecting port which communicates with said detecting section, and a check valve is provided in said connecting port, said check valve being displaceable by pressure of said fluid discharged from said body.

16. The two-way valve according to claim 9, further comprising a housing which is connected to an upper portion of said body, and a spring made of metal disposed in a chamber which is formed between said housing and said piston provided displaceably in said housing, wherein said spring urges said first diaphragm in a direction to be seated on said valve seat.

17. The two-way valve according to claim 16, wherein a connecting member is installed to said chamber and is connected to a nitrogen gas supply source, and nitrogen gas is supplied into said chamber via said connecting member.

18. The two-way valve according to claim 9, wherein a chemical solution for washing semiconductor chips flows through said fluid passage.

19. A two-way valve comprising:
a body in which a fluid passage for flowing a fluid is formed;
a piston which is provided in said body displaceably in an axial direction by a pilot pressure;
a shaft which is integrally connected to said piston;
a first diaphragm which is connected to one end of said shaft and which closes said fluid passage when said first diaphragm is seated on a valve seat formed on said body; and
a second diaphragm which is axially attached so that said second diaphragm is coaxially superimposed on said first diaphragm and which is provided displaceably together with said first diaphragm,
wherein a space is formed between a first skirt section of said first diaphragm extending radially outwardly and a second skirt section of said second diaphragm extending radially outwardly, and
wherein a chemical solution for washing semiconductor chips flows through said fluid passage.

20. The two-way valve according to claim 19, wherein an elastic member is arranged in said space, and said elastic member urges said first skirt section and said second skirt section to separate from each other.

21. The two-way valve according to claim 20, wherein said elastic member comprises a buffering spring member which is corrugated in a direction from an inner circumferential side to an outer circumferential side of said first diaphragm and said second diaphragm.

22. The two-way valve according to claim 21, wherein said buffering spring member is formed of the same resin material as a resin material of the first diaphragm and the second diaphragm.

23. The two-way valve according to claim 21, wherein a corrugated portion of said buffering spring member is interposed between said first diaphragm and said second diaphragm so that said portion contacts a wall surface of said first diaphragm and a wall surface of said second diaphragm.

24. The two-way valve according to claim 19, wherein said body is provided with a detecting section which detects a pressure value of said fluid when said fluid, which flows through said fluid passage, leaks out.

25. The two-way valve according to claim 24, wherein said body is formed with a connecting port which communicates with said detecting section, and a check valve being provided in said connecting port, said check valve being displaceable by pressure of said fluid discharged from said body.

26. The two-way valve according to claim 19, wherein said second diaphragm is retained by a holding section of a holding member which is axially attached to said shaft, said holding section being expanded radially outwardly.

27. The two-way valve according to claim 19, further comprising a housing which is connected to an upper portion of said body, and a spring made of metal disposed in a chamber which is formed between said housing and said piston provided displaceably in said housing, wherein said spring urges said first diaphragm in a direction to be seated on said valve seat.

28. The two-way valve according to claim 27, wherein a connecting member is installed to said chamber and is connected to a nitrogen gas supply source, and nitrogen gas is supplied into said chamber via said connecting member.

* * * * *